United States Patent
Horng

[11] Patent Number: 5,967,763
[45] Date of Patent: Oct. 19, 1999

[54] POSITIONING DEVICES FOR A SENSOR ELEMENT OF A MINIATURE FAN

[76] Inventor: Ching-Shen Horng, No. 3, Lane 45, Yi-Yung Road, Kaohsiung, Taiwan

[21] Appl. No.: 08/954,822

[22] Filed: Oct. 21, 1997

[51] Int. Cl.[6] .................................................. F04B 17/04
[52] U.S. Cl. ...................................... 417/423.7; 310/68 R
[58] Field of Search ........................................... 417/423.7

[56] References Cited

U.S. PATENT DOCUMENTS

| | | | |
|---|---|---|---|
| 5,010,263 | 4/1991 | Murata | 310/68 B |
| 5,093,599 | 3/1992 | Horng | 310/254 |
| 5,097,170 | 3/1992 | Baines | 310/268 |
| 5,245,236 | 9/1993 | Horng | 310/67 R |
| 5,510,726 | 4/1996 | Brady | 324/772 |
| 5,831,359 | 11/1998 | Jeske | 310/68 B |

*Primary Examiner*—Timothy S. Thorpe
*Assistant Examiner*—Ehud Gartenberg
*Attorney, Agent, or Firm*—Bacon & Thomas, PLLC

[57] ABSTRACT

A positioning device for a miniature fan includes a coil seat including a number of annularly spaced poles each having a radially extending stem and a circumferential arcuate section. Each stem has a winding wound therearound, and each arcuate section has a first end edge and a second end edge. A circuit board is securely connected to the coil seat and includes a sensor element mounted thereon. The sensor element is located on a vertical line extending from one of the first end edge and the second end edge of one of the poles.

7 Claims, 3 Drawing Sheets

POSITIONING DEVICES FOR A SENSOR ELEMENT OF A MINIATURE FAN

BACKGROUND OF THE INVENTION

1. Field of the Invention

The present invention relates to positioning devices for a sensor element of a miniature fan.

2. Description of the Related Art

A wide variety of miniature fans have heretofore been provided. For example, U.S. Pat. No. 5,492,458 discloses an electric fan including a housing having a hub formed in the center, a shaft having one end force-fitted in the hub and having an annular flange formed in the other end, two polar plates force-fitted on the shaft, and a stator disposed between the polar plates. Nevertheless, the starting effect of the motor of such an electric fan is not satisfactory as a sensor element on the circuit board for starting cannot be accurately aligned with an end edge of the polar plates. The present invention is intended to provide a positioning device for the sensor element which mitigates and/or obviates the above problems.

SUMMARY OF THE INVENTION

It is a primary object of the present invention to provide a positioning device which allows the motor of a miniature fan to be easily activated.

A positioning device for a miniature fan in accordance with the present invention comprises a coil seat including a plurality of annularly spaced poles each having a stem and an arcuate section. Each stem has a winding wound therearound, and each arcuate section has a first end edge and a second end edge. A circuit board is securely connected to the coil seat and includes a sensor element mounted thereon. The sensor element is located on a vertical line extending from one of the first end edge and the second end edge of one of the poles.

The pole having the first end edge or the second end edge aligned with the sensor element has a first mark means formed thereon, and the sensor element has a second mark means formed thereon which is aligned with the first mark means when mounting the sensor element onto the circuit board to assure that the sensor element is located on the vertical line.

The circuit board may include a notch defined therein for securely receiving the sensor element. The circuit board includes a third mark means aligned with the second mark means to provide a reference for mounting the sensor element in the notch by aligning with the second mark means of the sensor element with the third mark means.

Other objects, advantages, and novel features of the invention will become more apparent from the following detailed description when taken in conjunction with the accompanying drawings.

DESCRIPTION OF THE PREFERRED EMBODIMENTS

Figure 1:
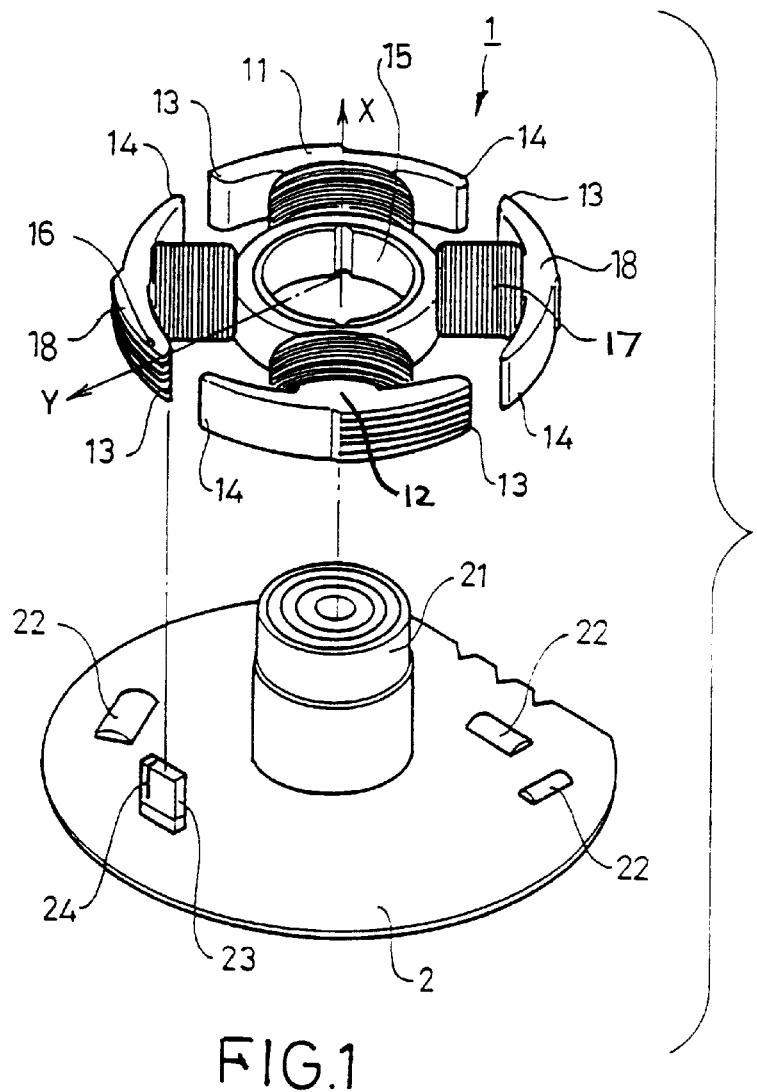
FIG. 1 is an exploded perspective view of a positioning device for miniature fans in accordance with the present invention.
Figure 2:
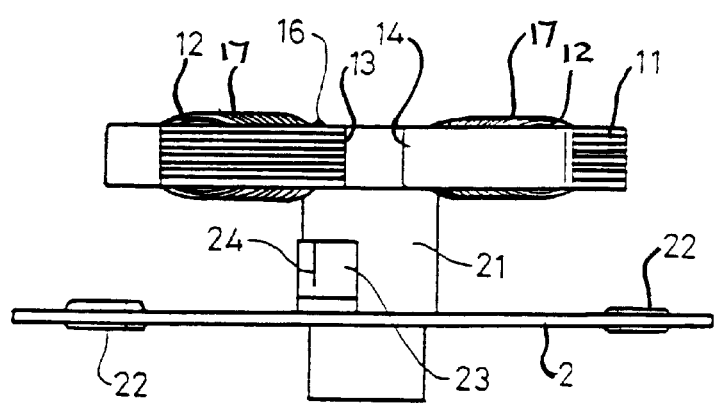
FIG. 2 is a schematic side view of the positioning device in accordance with the present invention.

Referring to the drawings and initially to FIGS. 1 and 2, a positioning device for miniature fans in accordance with the present invention generally includes a coil seat 1 and a circuit board 2. The coil seat 1 includes a number of annularly spaced poles 11 each having a radially extending stem 12 and a circumferential arcuate section 18 with a first end edge 13 and a second end edge 14. The stem 12 of each pole 11 includes a winding 14 wound therearound. The coil seat 1 includes a central opening 15 for receiving an axle 21 formed on a side of the circuit board 2.

The circuit board 2 includes a plurality of electric elements 22 for controlling rotation of the fan, which is conventional and therefore not described in detail. A sensor element 23 is mounted on the circuit board 2 in a manner that the first end edge 13 of one of the poles 11 aligns with the sensor element 23. For easy assembly, the first end edge 13 has a first mark means 16 formed thereon, and the sensor element 23 includes a second mark means 24 formed thereon such that when mounting the sensor element 23 on the circuit board 2 (the circuit board 2 has been engaged with the coil seat 1), the second mark 24 is aligned with a first mark 16 formed on the arcuate section 18 adjacent to the first end edge 13 to assure alignment of the sensor element 23 and the first end edge 13 in a vertical direction. The mark means 16 and 24 may be lines, dots, etc. By such an arrangement, the sensor element 23 on the circuit board 2 is accurately aligned with the first end edge 13 of one of the poles 11 to thereby provide a reliable starting of a rotor of the motor (not shown), which is conventional and therefore not further described.

Figure 3:
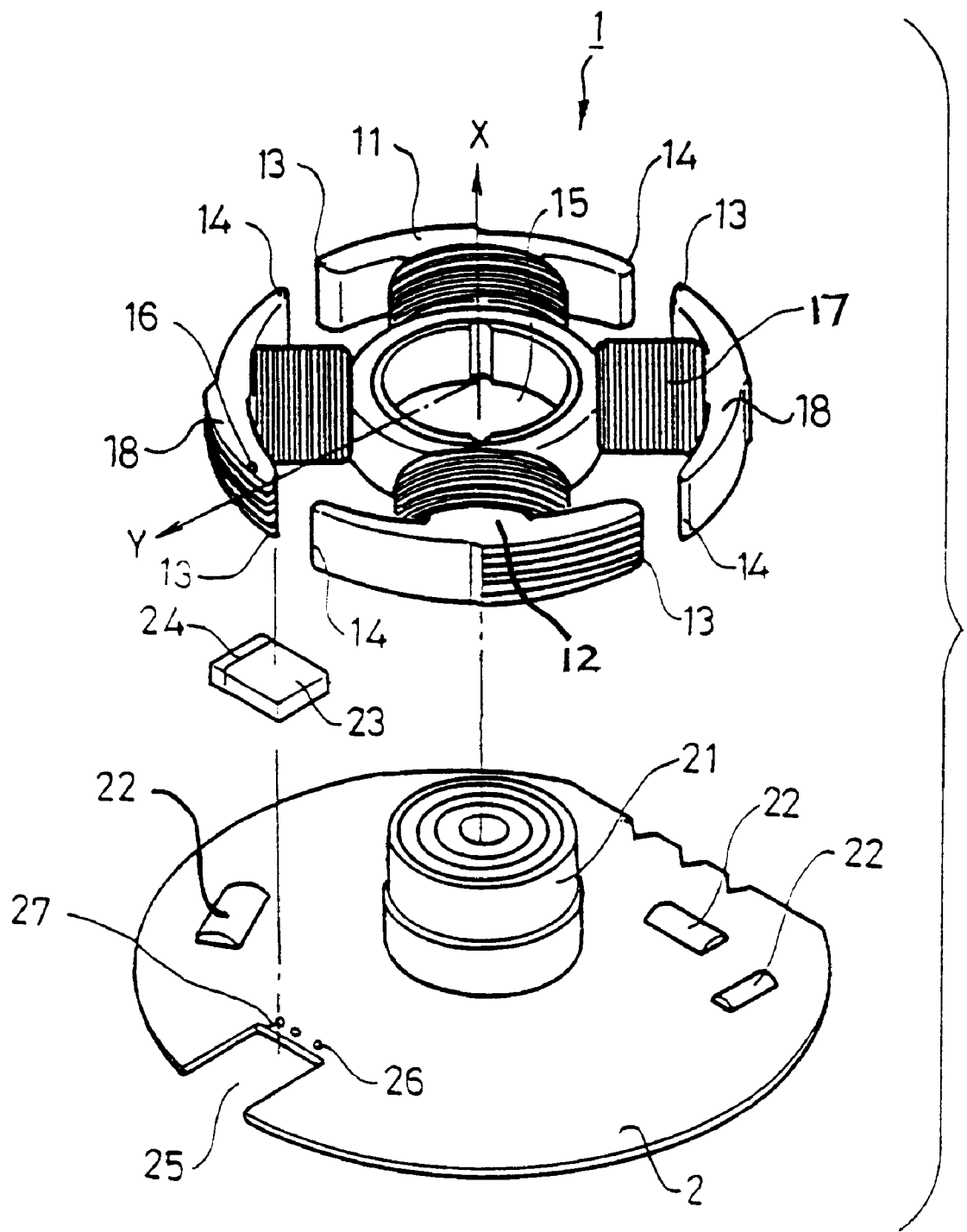
FIG. 3 is an exploded perspective view of a second embodiment of the positioning device in accordance with the present invention.

FIG. 3 illustrates a modified embodiment of the invention, wherein the circuit board 2 includes a notch 25 defined therein for receiving the sensor element 23 with the second mark 24 formed thereon. In addition, a number of pin holes 26 are defined in the circuit board 2 adjacent to the notch 25 for receiving the pins (not shown) of the sensor element 23, which is conventional and therefore not further described. The circuit board 2 includes a third mark means 27 formed adjacent to the notch 25. The mark means 16 and 24, and 27 may be lines, dots, etc. In assembly, the third mark means 27, which is already in alignment with the first mark means 16, provides a reference for aligning with the second mark means 24 such that the sensor element 23 is in alignment with the first end edge 13 of one of the poles 11 to thereby provide a reliable activation of the rotor of the motor.

Figure 4:
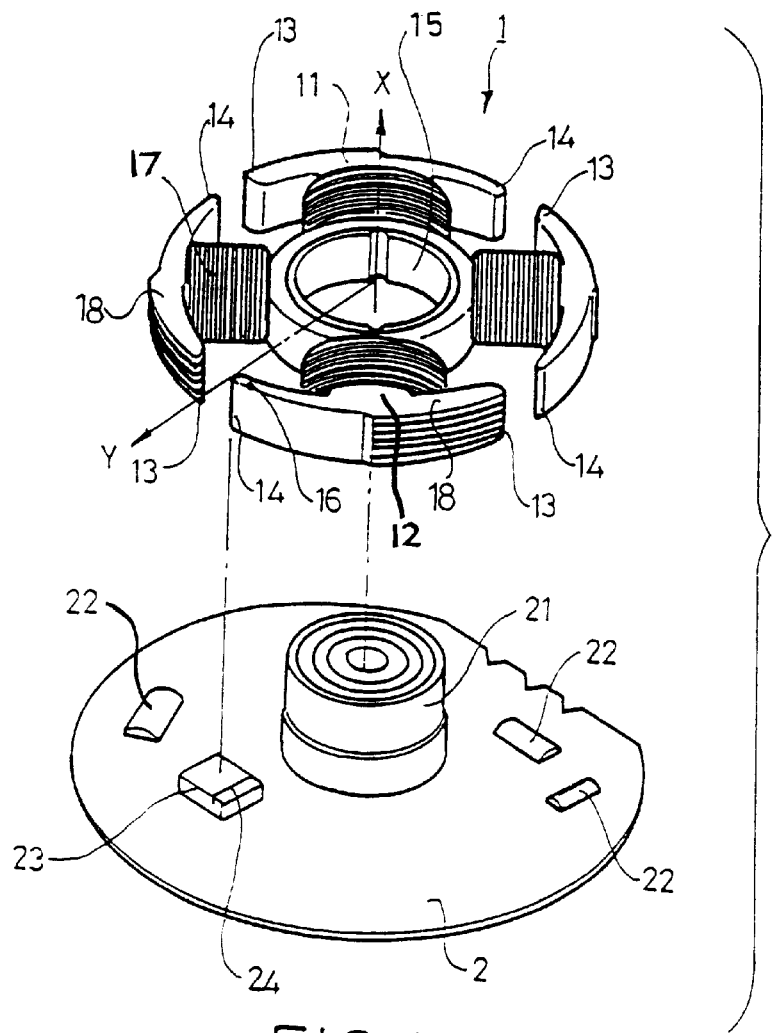
FIG. 4 is an exploded perspective view illustrating a third embodiment of the positioning device in accordance with the present invention.
Figure 5:
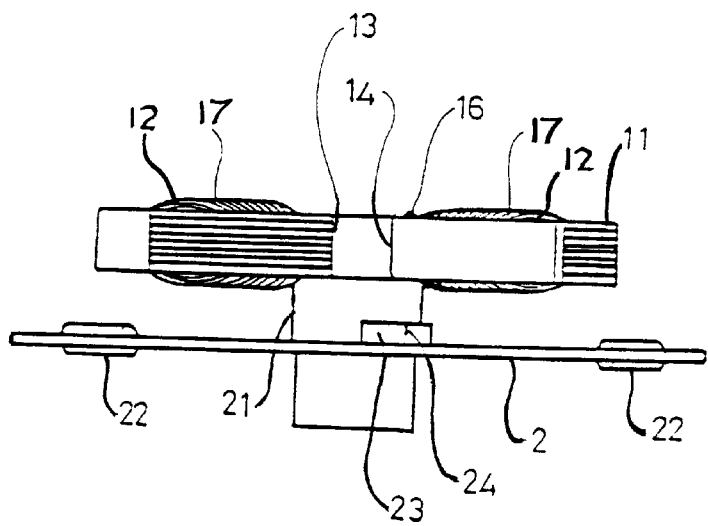
FIG. 5 is a schematic side view of the third embodiment of the positioning device.

FIGS. 4 and 5 illustrate a third embodiment of the invention, in which the second end edge 14 of one of the poles 11 aligns with the sensor element 23, while a first mark means 16 is provided on the arcuate section 18 adjacent to the rear end edge 14 to provide a reference for mounting the sensor element 23 onto the circuit board 2.

Conclusively, the sensor element 23 is located on a vertical line extending from the end edge 13, 14 of one of the poles 11 along a direction parallel to a longitudinal axis "X" of the coil seat 1 such that the rotor may be reliably activated to rotate.

Although the invention has been explained in relation to its preferred embodiment, it is to be understood that many other possible modifications and variations can be made without departing from the spirit and scope of the invention as hereinafter claimed.

What is claimed is:

1. A positioning device for a miniature fan, comprising:

a coil seat including a plurality of annularly spaced poles, each pole having a radially extending stem and terminating with a circumferential arcuate section, each stem having a winding wound therearound, each arcuate section having a first end edge and a second end edge;

a circuit board securely connected to the coil seat; and, a sensor element mounted on the circuit board, the sensor element being located on a vertical line extending from one of the first end edge and the second end edge of one of the poles so that the sensor element is aligned with the one of the first end edge and the second end edge.

2. The positioning device according to claim 1, wherein the pole having the first end edge thereof aligned with the sensor element has a first mark means formed thereon, and the sensor element has a second mark means formed thereon which is aligned with the first mark means when mounting the sensor element onto the circuit board to assure that the sensor element is located on the vertical line.

3. The positioning device according to claim 2, wherein the circuit board includes a notch defined therein for securely receiving the sensor element.

4. The positioning device according to claim 3, wherein the circuit board includes a third mark means aligned with the second mark means to provide a reference for mounting the sensor element in the notch by aligning with the second mark means of the sensor element with the third mark means.

5. The positioning device according to claim 1, wherein the pole having second end edge thereof aligned with the sensor element has a first mark means formed thereon, and the sensor element has a second mark means formed thereon which is aligned with the first mark means when mounting the sensor element onto the circuit board to assure that the sensor element is located on the vertical line.

6. The positioning device according to claim 5, wherein the circuit board includes a notch defined therein for securely receiving the sensor element.

7. The positioning device according to claim 6, wherein the circuit board includes a third mark means aligned with the second mark means to provide a reference for mounting the sensor element in the notch by aligning with the second mark means of the sensor element with the third mark means.

* * * * *

Disclaimer 5,967,763—Ching-Shen Horng, No. 3, Lane 45, Yi-Yung Road, Kaohsiung, Taiwan. POSITIONING DEVICES FOR A SENSOR ELEMENT OF A MINIATURE FAN. Patent dated Oct. 19, 1999. Disclaimer filed Dec. 9, 2002, by the inventor.

Hereby enters this disclaimer to claims 1-7, of said patent.

*(Official Gazette, October 7, 2003)*

(12) EX PARTE REEXAMINATION CERTIFICATE (5348th)
United States Patent
Horng

(10) Number: US 5,967,763 C1
(45) Certificate Issued: Apr. 18, 2006

(54) POSITIONING DEVICES FOR A SENSOR ELEMENT OF A MINIATURE FAN

(75) Inventor: Ching-Shen Horng, Kaohsiung (TW)

(73) Assignee: Sunnonwealth Electric Machine Industry Co., Ltd., Kaohsiung (TW)

Reexamination Request:
No. 90/005,953, Mar. 15, 2001

Reexamination Certificate for:
| | |
|---|---|
| Patent No.: | 5,967,763 |
| Issued: | Oct. 19, 1999 |
| Appl. No.: | 08/954,822 |
| Filed: | Oct. 21, 1997 |

Disclaimer of claims 1 through 7 Filed Dec. 9, 2002 (Oct. 7, 2003 O.G.).

(51) Int. Cl.
*F04B 17/03* (2006.01)
*F04B 17/04* (2006.01)

(52) U.S. Cl. .................................. 417/423.7; 310/68 R
(58) Field of Classification Search .............. 417/423.7; 310/68 R
See application file for complete search history.

(56) References Cited

U.S. PATENT DOCUMENTS

| | | | |
|---|---|---|---|
| 4,429,263 A | 1/1984 | Muller | 318/254 |
| 4,547,714 A | 10/1985 | Muller | 318/254 |

OTHER PUBLICATIONS

Summary Judgment Motion Regarding Patent Nos.: 5,967,763, 6,109,892, and 6,114,785; Case No.: SACV–00–1041 GLT(ANx); Oct. 1, 2001; Central Division of California, Southern Division.
ADDA Hypro Fan; ADDA Corporation catalog; ADDAX 0148–ADDAX 0153.
Hypro Fan—Best Choice for 24 Hour Cooling Needs Every Day!; ADDA Corporation catalog; ADDAX 0156.
ADDA Thermal Management Devices; ADDA Corporation catalog; ADDAX 0158–ADDAX 0163.
ADDA Thermal Management Devices; ADDA Corporation catalog; ADDAX 0096–ADDAX 0146.
ADDA Hypro Fan; ADDA Corporation catalog; ADDAX 0036–ADDAX 0095.

*Primary Examiner*—Charles G Freay

(57) ABSTRACT

A positioning device for a miniature fan includes a coil seat including a number of annularly spaced poles each having a radially extending stem and a circumferential arcuate section. Each stem has a winding wound therearound, and each arcuate section has a first end edge and a second end edge. A circuit board is securely connected to the coil seat and includes a sensor element mounted thereon. The sensor element is located on a vertical line extending from one of the first end edge and the second end edge of one of the poles.

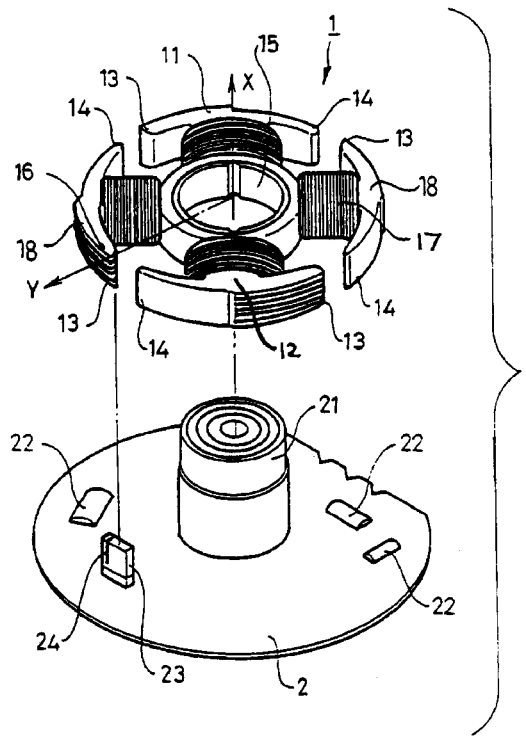

EX PARTE REEXAMINATION CERTIFICATE ISSUED UNDER 35 U.S.C. 307

THE PATENT IS HEREBY AMENDED AS INDICATED BELOW

AS A RESULT OF REEXAMINATION, IT HAS BEEN DETERMINED THAT:

Claims 1–7 are now disclaimed.

* * * * *